United States Patent [19]

Tsutsumi et al.

[11] Patent Number: 5,608,631
[45] Date of Patent: Mar. 4, 1997

[54] APPARATUS AND METHOD FOR DETECTING ACCELERATION OF MOTOR VEHICLE WITH HIGH ACCURACY AND ANTI-SKID CONTROL APPARATUS USING THE SAME

[75] Inventors: Kazumichi Tsutsumi; Takahiro Nishimura, both of Himeji, Japan

[73] Assignee: Mitsubishi Denki Kabushiki Kaisha, Tokyo, Japan

[21] Appl. No.: 209,875

[22] Filed: Mar. 14, 1994

[30] Foreign Application Priority Data

Mar. 16, 1993 [JP] Japan .................................. 5-055583
Mar. 16, 1993 [JP] Japan .................................. 5-055584

[51] Int. Cl.$^6$ ............................................... B60T 8/72
[52] U.S. Cl. ........................... 364/426.018; 364/571.01; 364/571.04; 364/566; 73/1 D; 73/507
[58] Field of Search ...................... 364/426.01, 426.02, 364/426.03, 566, 571.01, 571.02, 571.04, 571.05; 303/103, 105; 180/197; 123/333, 481, 493; 324/162, 161, 202, 207.12; 73/498, 507, 1 R, 1 D

[56] References Cited

U.S. PATENT DOCUMENTS

| | | | |
|---|---|---|---|
| 4,896,268 | 1/1990 | MacGugan | 364/566 |
| 4,900,100 | 2/1990 | Higashimata et al. | 364/426.02 |
| 4,935,883 | 6/1990 | Hulsing | 364/571.01 |
| 4,974,163 | 11/1990 | Yasuno et al. | 364/426.02 |
| 5,019,984 | 5/1991 | Masaki et al. | 364/426.02 |
| 5,046,787 | 9/1991 | Kuwana et al. | 364/426.02 |
| 5,072,393 | 12/1991 | Moro et al. | 364/426.02 |
| 5,140,524 | 8/1992 | Matsuda | 364/426.02 |
| 5,200,896 | 4/1993 | Sato et al. | 364/566 |
| 5,243,544 | 9/1993 | Schoess | 364/566 |
| 5,307,274 | 4/1994 | Takata et al. | 364/566 |
| 5,365,768 | 11/1994 | Suzuki et al. | 73/1 R |
| 5,479,161 | 12/1995 | Keyes et al. | 364/571.02 |

FOREIGN PATENT DOCUMENTS

| | | |
|---|---|---|
| 77352 | 3/1990 | Japan . |
| 310162 | 12/1990 | Japan . |
| 244463 | 9/1992 | Japan . |
| 372452 | 12/1992 | Japan . |

*Primary Examiner*—Kevin J. Teska
*Assistant Examiner*—Tyrone V. Walker
*Attorney, Agent, or Firm*—Sughrue, Mion, Zinn, Macpeak & Seas

[57] ABSTRACT

An apparatus for determining acceleration of a motor vehicle includes an acceleration sensor for generating a signal representing acceleration of the motor vehicle, wheel speed sensor means for generating wheel speed signals indicating wheel speeds of individual wheels of the motor vehicle, and a first arithmetic unit for determining a mean value of the output signal of the acceleration sensor over a predetermined period in the running state of the motor vehicle in which the motor vehicle is making a substantially straight drive at a substantially constant speed on a substantially level ground surface during the aforementioned predetermined period, to thereby output a signal indicating the mean value, and a second arithmetic unit for determining acceleration of the motor vehicle by subtracting the mean value from the output of the acceleration sensor. An anti-skid control apparatus for a motor vehicle for controlling braking forces applied to individual wheels of the motor vehicle on the basis of differences between a vehicle speed and wheel speeds in order to prevent the wheels from being locked. The vehicle speed is determined by integrating the output of the second arithmetic unit of the acceleration determining apparatus.

32 Claims, 10 Drawing Sheets

APPARATUS AND METHOD FOR DETECTING ACCELERATION OF MOTOR VEHICLE WITH HIGH ACCURACY AND ANTI-SKID CONTROL APPARATUS USING THE SAME

BACKGROUND OF THE INVENTION

1. Field of the Invention

The present invention generally relates to an anti-skid control apparatus for a motor vehicle which includes an acceleration sensor for detecting acceleration of the motor vehicle for utilization of the acceleration information in the anti-skid control. More particularly, the invention is concerned with an improved anti-skid control apparatus which is essentially insusceptible to the influence of an offset quantity usually applied to the output of the acceleration sensor in order to compensate for variances in the characteristic thereof. Furthermore, the present invention is concerned with an apparatus for detecting acceleration of a motor vehicle by using a conventional acceleration sensor, which apparatus can be used not only for the anti-skid control but also for other purposes.

2. Description of the Related Art

For a better understanding of the invention, description will first be directed to the related or background techniques.

FIG. 10 is a schematic block diagram for illustrating a structure of a typical one of the anti-skid control apparatuses known heretofore.

Referring to the figure, the anti-skid control apparatus includes as a major part a controller 1 comprised of a microcomputer 5 which incorporates therein a central processing unit (CPU), a read-only memory (ROM), a random access memory (RAM) and others. As the peripheral devices of the controller 1, there are provided an acceleration sensor 2 for detecting acceleration of a motor vehicle (not shown) which is equipped with the anti-skid control apparatus under consideration, and wheel speed sensors 3, 6, 8 and 10 for detecting velocities or speeds of the individual wheels (not shown) of the motor vehicle for generating wheel speed signals each of a sinusoidal waveform and having a frequency varying in proportion to the wheel speed as detected. The detection signals outputted from these wheel speed sensors 3, 6, 8 and 10 are supplied to associated waveform shaping circuits 4, 7, 9 and 11, respectively, each of which serves to convert the detection signal supplied from the associated wheel speed sensor into a pulse signal, which is then supplied to the microcomputer 5. The waveform shaping circuits 4, 9, 7 and 11 are incorporated in the controller 1. Further, the controller 1 includes current control circuits 12, 15, 17 and 19 for controlling currents supplied to solenoid valves 13, 16, 18 and 20, respectively, of a hydraulic brake system in accordance with current control commands issued by the microcomputer 5. All the solenoid valves 13, 16, 18 and 20 are electrically connected to a common power supply source 14.

For clarifying the problem which the invention is to solve, description will be made of the characteristic of the acceleration sensor 2 by reference to FIG. 11 which shows in a characteristic diagram a typical characteristic of the acceleration sensor 2. Referring to FIG. 11, the detection voltage VG outputted from the acceleration sensor 2 and indicating the acceleration of the motor vehicle body is taken along the ordinate with the actual vehicle body acceleration being taken along the abscissa. In this figure, a solid line curve represents an ideal characteristic while a broken line curve represents a characteristic which is offset from the ideal characteristic by an offset quantity or voltage v. In the case of the acceleration sensor 2 having the ideal characteristic, the detection voltage VG changes linearly in proportion to the actual vehicle acceleration and exhibits a predetermined voltage value VGS when the vehicle acceleration is zero. Further, in the case of the illustrated example, the detection voltage VG is offset by the quantity v of minus sign. Parenthetically, magnitude of the offset voltage v is determined in dependence on the characteristic of the acceleration sensor actually installed as well as time-dependent tendency of change because these factors will differ from one sensor to another.

Next, description will turn to control operations performed by the microcomputer 5 of the known anti-skid control apparatus by reference to a flow chart of FIG. 12.

The acceleration sensor 2 is adapted to detect acceleration of the motor vehicle in the state where the vehicle is being driven. The detected vehicle body acceleration signal is supplied to the microcomputer 5 as the input data. At the same time, the wheel speed sensors 3, 6, 8 and 10 generate the sinusoidal waveform signals having frequencies changing in dependence on the velocity or speeds of the associated wheels, respectively, which signals are converted to corresponding pulse signals through the waveform shaping circuits 4, 7, 9 and 11, respectively, and then supplied to the microcomputer 5.

In a step S1, the microcomputer 5 calculates the wheel speeds on the basis of the wheel speed signals as inputted, whereupon the processing proceeds to a step S2. More specifically, in the step S1, the microcomputer 5 arithmetically determines the periods of the wheel speed pulse signals supplied from the waveform shaping circuits 4, 7, 9 and 11, respectively, by activating a corresponding interrupt processing (not shown), to thereby calculate the wheel speeds VW in terms of the reciprocals of the periods as determined.

In the step S2, differences between the wheel speeds VW determined currently in the step S1 and the wheel speeds determined in the preceding cycle are calculated to thereby obtain the wheel accelerations GW. Then, the processing proceeds to a step S3 in which the detection voltage VG generated by the acceleration sensor 2 is converted into digital data through an analogue-to-digital (A/D) converter (not shown), the digital data being fetched by the microcomputer 5. Then, the processing proceeds to a step S4.

In the step S4, the vehicle acceleration GB is determined on the basis of the digital data mentioned above, whereupon decision is made whether a brake oil pressure P of a hydraulic brake system (not shown) is to be increased, decreased or alternatively to be held at a current value on the basis of the vehicle acceleration GB, the wheel speeds VW and the wheel accelerations GW in accordance with a predetermined algorithm (not shown).

In the step S5, the microcomputer 5 outputs current command values to the current control circuits 12, 15, 17 and 19, respectively, in accordance with the results of the decision step S4, whereby the currents of the corresponding values are supplied to the solenoid valves 13, 16, 18 and 20, respectively, from the power supply source 14, as a result of which the brake oil pressures P for the hydraulic brakes (provided in association with the wheels, respectively) are increased, decreased or alternatively held at the respective current levels. In this manner, the anti-skid control is effectuated. The routine including the processing steps S1 to S5 mentioned above are executed cyclically or periodically at a predetermined time interval TL.

Next, referring to a waveform diagram shown in FIG. 13, operation of the anti-skid control apparatus shown in FIG. 10 will be elucidated in detail. In this figure, a solid line curve A represents the detection voltage signal VG generated by the acceleration sensor 2, a solid line curve Ba represents an actual vehicle speed, a broken line curve Bb represents the Vehicle speed VB estimated on the basis of the output of the acceleration sensor 2, a solid line curve Bc represents the wheel speeds VW, a solid line curve C represents changes in the brake oil pressure, and a pulse waveform D represents the current command signal issued by the microcomputer 5 in which a pressure reduction-command is indicated by a pulse of relatively long duration, a pressure increase command is represented by a series of short pulses, and a hold command is represented by a base line.

Now, let's assume that the brake pedal is actuated or depressed in the course of driving the motor vehicle. Then, the braking oil pressure P for the wheels increases steeply, as can be seen from the curve C. When the braking force exceeds or overcomes the friction between the ground surface and tires of the wheels, the latter will immediately transit to the locked state. At that time, the wheel acceleration signals GW assumes a large value of minus sign (i.e., deceleration), and magnitude of slip or skid (given in terms of differences between the vehicle speed VB and the wheel speeds VW) increases steeply. The microcomputer 5 detects occurrence of the locked state of the wheels on the basis of the wheel decelerations GW and the slip to issue to the current control circuits 12, 15, 17 and 19 current commands for decreasing the brake oil pressure P. As a consequence, the brake oil pressure P is decreased under the actions of the solenoids 13, 16, 18 and 20, whereby the wheels are restored or released from the locked state. Thus, the wheel acceleration signals GW shifts from the minus region (deceleration) to the plus region (acceleration), as a result of which tendency for occurrence of slippage is mitigated.

When the wheels are released or restored from the locked state, the microcomputer 5 detects this event on the basis of the wheel acceleration signals GW and the change in the slip and issues the current hold command to the current control circuits 12, 15, 17 and 19, as a result of which the brake oil pressure P effective currently is held under the action of the solenoids 13, 16, 18 and 20.

When the wheels are restored substantially completely from the lock tendency with the wheel speeds approaching sufficiently to the vehicle speed VB, the brake oil pressure increases only, progressively, because the microcomputer executes repeatedly the processing for issuing the current command to increase the brake oil pressure only for a short time and then the current level hold command. Consequently, the brake oil pressure P increases progressively, as indicated by stepwise progressive changes in the curve C. Eventually, the friction between the ground surface and the wheels is exceeded by the braking force, where by the wheels are again locked, whereupon the microcomputer 5 issues the current command for decreasing the brake oil pressure to the current control circuits 12, 15, 17 and 19. By repeating the control procedure described above, the brake oil pressure for the wheels is so controlled that the braking force for the wheels lies in the vicinity of a value indicating maximal friction between the road surface and the tires of the wheels.

It should here be mentioned that in the anti-skid control apparatus of the type described above, availability of the vehicle speed VB is indispensable. However, it is very difficult from the technical standpoint to detect straightforwardly the vehicle speed signal. Under the circumstances, the vehicle speed VB is estimated by resorting to various methods.

Again referring to FIG. 13, a method of estimating or calculating the vehicle speed VB will be described. So long as there exists no tendency of the wheels being locked, the wheel speed VW may be considered to coincide at least approximately with the actual vehicle speed. Accordingly, the vehicle speed VB can be estimated directly from the wheel speed VW. On the other hand, when the wheels tend to lock, the vehicle speed VB is decreased in conformance with a gradient corresponding to the vehicle acceleration GB. In other words, the vehicle speed VB can be determined by integrating the vehicle acceleration GB. When the wheels get free of the lock tendency and reaches the speed level corresponding to the vehicle speed VB, the latter can be determined directly from the wheel speeds VW. The vehicle speed is determined by executing repetitively the series of operations described above.

At this juncture, it should be mentioned that a method of determining indirectly the vehicle speed VB by integrating the detection voltage signal VG generated by the acceleration sensor is disclosed in Japanese Unexamined Patent Application Publication No. 77352/1990 (JP-A-H2-77352).

The anti-skid control apparatus known heretofore and implemented in the configuration described above suffers problems mentioned below. First, because the characteristic of the acceleration sensor is not always ideal, the vehicle speed determined by integrating the detection signal outputted from the acceleration sensor will unavoidably contain error more or less, which presents an obstacle to realization of the anti-skid control in a satisfactory manner. Inherently, the anti-skid control is so designed as to be effective on a road surface of small friction. Consequently, when the offset (i.e., the output of the acceleration sensor when the vehicle acceleration is zero) is set at a large value with a view to compensating for the variances mentioned above, the anti-skid control will become effective even in the situation where the anti-skid control is not required. The problems mentioned above can be ascribed to the fact that with the conventional vehicle acceleration sensor, it is difficult or impossible to detect the acceleration of the motor vehicle with sufficiently high accuracy for practical applications such as anti-skid brake control of the motor vehicle.

SUMMARY OF THE INVENTION

In the light of the state of the art described above, it is an object of the present invention to provide an apparatus for detecting acceleration of a motor vehicle with high accuracy by using a conventional acceleration sensor.

Another object of the present invention is to solve the problems of the hitherto known anti-skid control apparatus and provide an improved anti-skid control apparatus which is capable of performing the anti-skid control in a satisfactory manner by nullifying the adverse influence of the offset applied to the acceleration signal.

In view of the above and other objects which will become apparent as description proceeds, the present invention is directed to an apparatus for detecting acceleration of a motor vehicle with high reliability as well as an anti-skid control apparatus and method for a motor vehicle for controlling braking forces applied to individual wheels of the motor vehicle on the basis of differences between a vehicle speed and wheel speeds in order to prevent skid or slip of the wheels. There is provided according to a general aspect of the present invention an apparatus for determining acceleration of a motor vehicle including an acceleration sensor for generating a signal representing acceleration of the motor vehicle, wheel speed sensor means for generating wheel speed signals indicating wheel speeds of individual wheels of the motor vehicle, and a first arithmetic means for determining a mean value of the output signal of the acceleration sensor over a predetermined period in the running state of the motor vehicle in which the motor vehicle is making a substantially straight drive at a substantially constant speed on a substantially level ground surface during the aforementioned predetermined period, to thereby output a signal indicating the mean value, and a second arithmetic means for determining acceleration of the motor vehicle by subtracting the mean value from the output of the acceleration sensor.

With the arrangement of the acceleration determining apparatus described above, the acceleration of the motor vehicle can be detected with improved accuracy notwithstanding of variance of the characteristic of the acceleration sensor and time-dependent change thereof.

According to a first aspect of the invention, there is provided an anti-skid control method for a motor vehicle for controlling braking forces applied to individual wheels of the motor vehicle on the basis of differences between a vehicle speed and wheel speeds in order to prevent skid of the wheels relative to the ground, which method comprises the steps of detecting acceleration of the motor vehicle, detecting wheel speeds of individual wheels of the motor vehicle, and controlling braking forces to be applied to the wheels, respectively, on the basis of differences between a vehicle speed of the motor vehicle and the wheel speeds.

The control step mentioned above includes the steps of determining a mean value of the detected acceleration over a predetermined period in the state where undermentioned conditions (a) to (c) are continuously satisfied during the aforementioned period:

(a) accelerations of the wheels are not greater than a predetermined value, (b) difference in the wheel speed among the individual wheels is not greater than a predetermined value, and (c) the wheel speed is continuously higher than a predetermined value, and a step of determining the vehicle speed by integrating a signal derived by subtracting the offset quantity from the acceleration actually detected.

For carrying out the method described above, the invention further provides an anti-skid control apparatus for a motor vehicle, which apparatus comprises an acceleration sensor for detecting acceleration of the motor vehicle, wheel speed sensors for detecting speeds of individual wheels of the motor vehicle, and a controller for controlling braking forces to be applied to the wheels, respectively, on the basis of the outputs of the acceleration sensor and the wheel speed sensors, wherein the controller determines a mean value of the output of the acceleration sensor as an offset quantity for a predetermined period on the conditions that accelerations or decelerations of the wheels, differences in the wheel speed among different wheels, change in the wheel speed of each of the wheels and change in the output of the acceleration sensor are smaller than respective predetermined values and that the wheel speed of each of the wheels is greater than a predetermined value, and then determines a vehicle speed of the motor vehicle on the basis of a value obtained by subtracting the offset quantity from the output of the acceleration sensor.

Further, according to a second aspect of the invention, there is provided an anti-skid control apparatus for a motor vehicle, which apparatus comprises an acceleration sensor for detecting acceleration of the motor vehicle, wheel speed sensors for detecting speeds of individual wheels of the motor vehicle, and a controller for controlling braking forces to be applied to the wheels, respectively, on the basis of the outputs of the acceleration sensor means and the wheel speed detecting means, wherein the controller includes an averaging means for determining a mean value of the output of the acceleration sensor over a predetermined period on the conditions that accelerations or decelerations of the wheels and differences in the wheel speed among different wheels are both smaller than respective predetermined values and that the motor vehicle is driven with two driving wheels, a subtraction means for subtracting a vehicle acceleration determined on the basis of changes in the wheel speeds during said period from the aforementioned mean value, and a store means for storing a value obtained from the subtraction as an offset quantity for the acceleration sensor, and a means for determining a vehicle speed of the motor vehicle on the basis of a value obtained by subtracting the offset quantity from the output of the acceleration sensor means.

In a preferred mode for carrying out the invention, the vehicle speed is determined by integrating digitally the signal derived by subtracting the offset quantity from the output of the acceleration sensor.

With the arrangement of the anti-skid control apparatus according to the first aspect of the invention, influence of the offset quantity applied to the output signal of the acceleration sensor can be mitigated, whereby the anti-skid control can be realized in a satisfactory manner. Further, the anti-skid control performance can be realized more accurately according to the second aspect of the invention.

The above and other objects, features and attendant advantages of the present invention will more easily be understood by reading the following description of the preferred embodiments thereof taken, only by way of example, in conjunction with the drawings.

DESCRIPTION OF THE PREFERRED EMBODIMENTS

Now, the present invention will be described in detail in conjunction with preferred or exemplary embodiments thereof by reference to the drawings.

Embodiment 1

Figure 1:
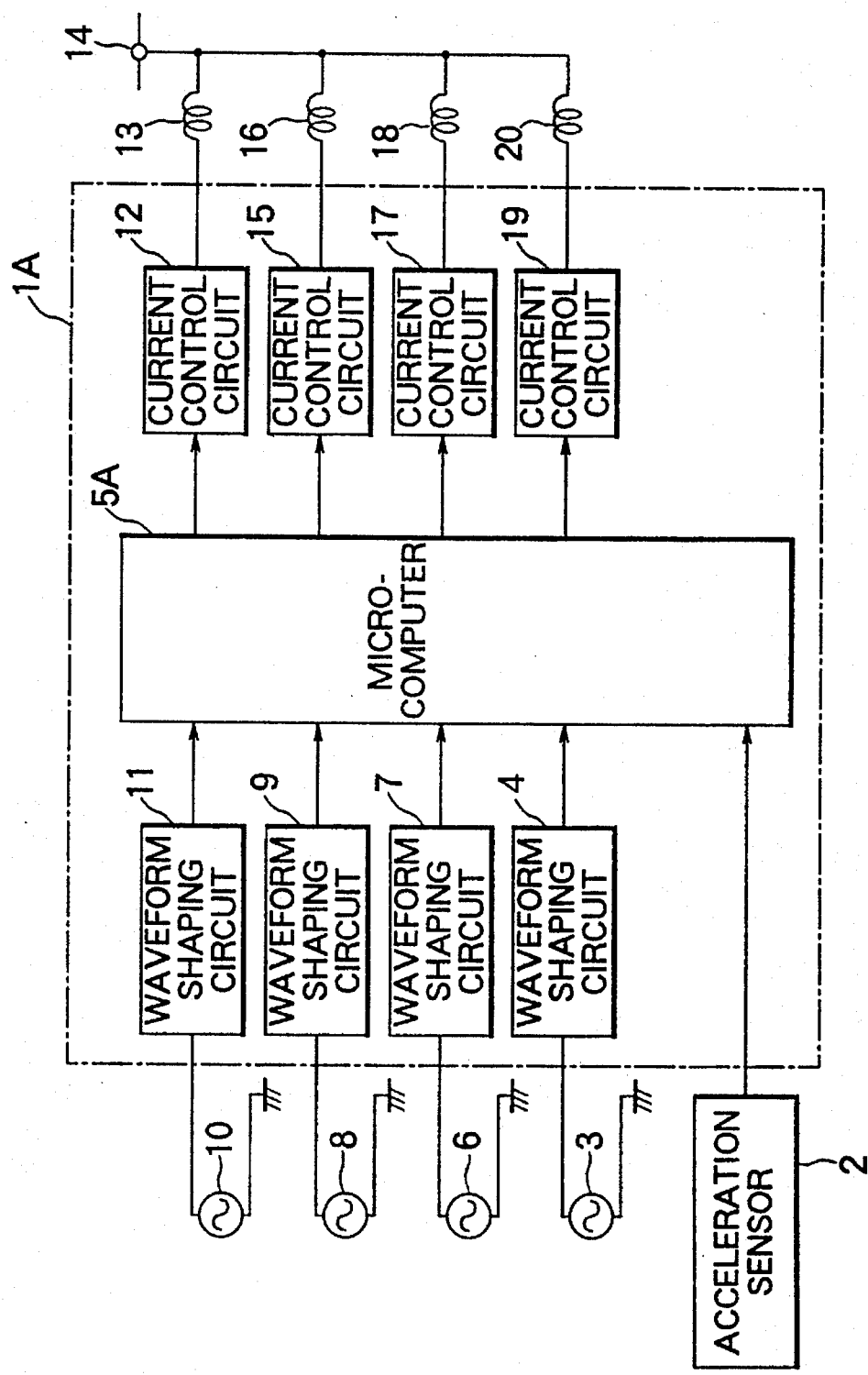
FIG. 1 is a schematic block diagram showing generally a structure of an anti-skid control apparatus according to a first embodiment which incarnates the first aspect of the invention.

FIG. 1 is a schematic block diagram showing generally a structure of an anti-skid control apparatus according to a first embodiment which incarnates the first aspect of the invention. In the figure, components same as or equivalent to those shown in FIG. 10 and described hereinbefore are denoted by like reference numerals. Accordingly, repeated description concerning the arrangement of the apparatus will be unnecessary. It should however be added that a controller generally denoted by reference character 1A is comprised of a microcomputer 5A, waveform shaping circuits 4, 7, 9 and 11 and current control circuits 12, 15, 17 and 19 and so programmed as to effectuate the anti-skid control for a motor vehicle in accordance with the teachings of the invention.

Figure 2:
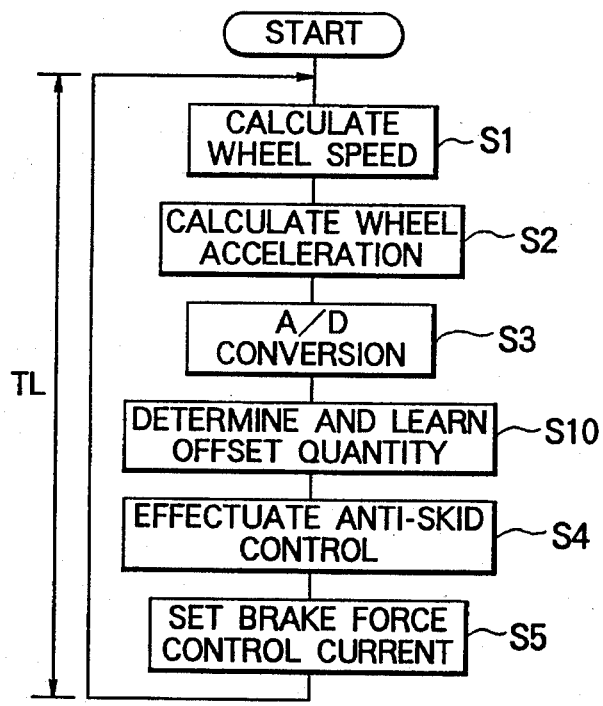
FIG. 2 is a flow chart for illustrating operation of the anti-skid control apparatus shown in FIG. 1.

Now, referring to a flow chart of FIG. 2, description will be made of operation of the anti-skid control apparatus shown in FIG. 1.

The acceleration sensor 2 detects acceleration of the motor vehicle when the latter is running. The detected vehicle acceleration GB is supplied to the microcomputer 5A. At the same time, the wheel speed sensors 3, 6, 8 and 10 generate the sinusoidal waveform signals having frequencies corresponding to the wheel speeds VW of the associated wheels, respectively, which signals are converted to corresponding pulse signals through the waveform shaping circuits 4, 7, 9 and 11, respectively, and then supplied to the microcomputer 5A.

In a step S1, the microcomputer 5A calculates the wheel speeds VW, whereupon the processing proceeds to a step S2. In the step S1, the microcomputer 5A arithmetically determines the periods of the wheel speed pulse signals supplied from the waveform shaping circuits 4, 7, 9 and 11, respectively, by activating a correspondingly programmed interrupt routine (not shown), to thereby calculate the wheel speeds VW in terms of the reciprocals of the periods as determined.

In the step S2, differences between the wheel speeds VW calculated currently in the step S1 and the wheel speeds determined in the preceding cycle are determined to thereby compute the wheel accelerations GW. In this juncture, it should be recalled that the processing procedure is cyclically activated as a routine at a predetermined time interval. Then, the processing proceeds to a step S3. In the step S3, the detection voltage VG generated by the acceleration sensor 2 is converted into digital data through an analogue-to-digital (A/D) converter (not shown), the digital data being fetched by the microcomputer 5A, whereupon the processing proceeds to a step S10.

In the step S10, an offset quantity GS0 is determined by executing a learning procedure, and the vehicle acceleration GB is determined by subtracting the offset GS0 from the detection data GSI.

In a step S4, it is determined whether the brake oil pressure P is to be increased or decreased or alternatively to be held at the current level on the basis of the wheel speeds VW, the wheel accelerations GW and the vehicle acceleration GB in accordance with a predetermined algorithm, whereupon the processing proceeds to a step S5.

In the step S5, current command signals are generated to the current control circuits 12, 15, 17 and 19, respectively, in accordance with the results of the processing step S4. Thus, the electric currents of the values designated by the command signals mentioned above are supplied to the solenoids 13, 16, 18 and 20 from the power supply source 14, whereby the brake oil pressure P of the hydraulic brake system (not shown) is increased, decreased or held as it is. Thus, the anti-skid control is effectuated. The routine including the processing steps S1, S2, S3, S10, S4 and S5 is cyclically or periodically executed at a predetermined time interval TL, as mentioned previously.

Figure 3:
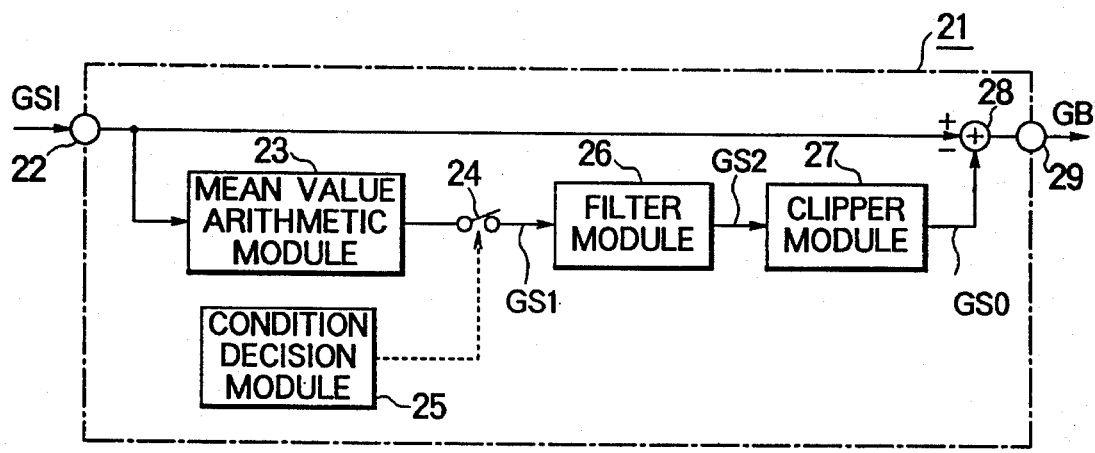
FIG. 3 is a block diagram showing a functional configuration of a microcomputer constituting a major part of the anti-skid control apparatus according to the invention.

Next, description will be directed to a method of eliminating the offset from the output signal of the acceleration sensor 2 by reference to FIG. 3 which shows a functional block diagram of the microcomputer 5A.

Figure 4:
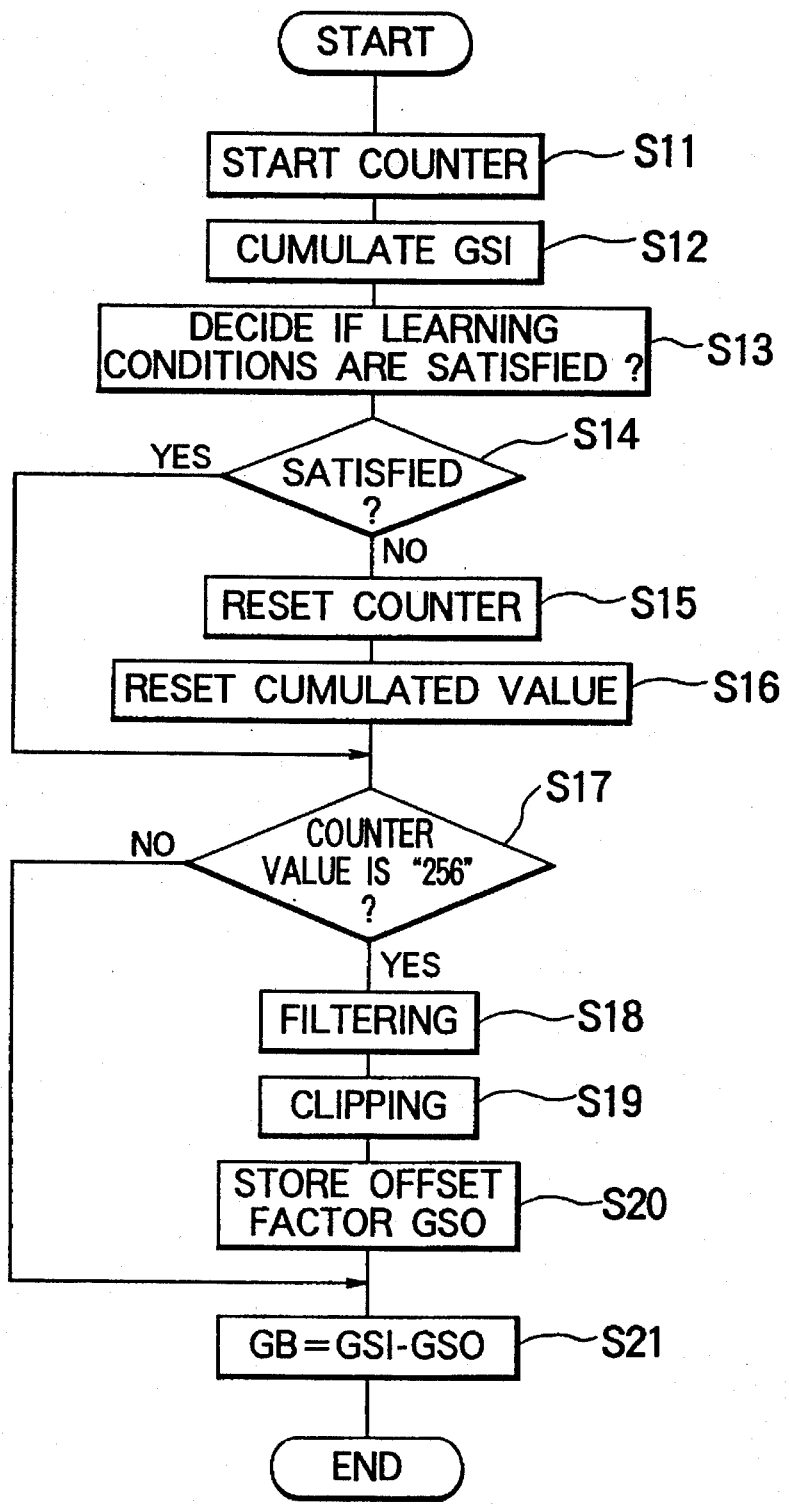
FIG. 4 is a flow chart for illustrating a routine processing executed by the microcomputer in a step (S10) shown in FIG. 2.

Referring to FIG. 3, an offset eliminating function block generally designated by a reference numeral 21 includes an input terminal 22 to which the acceleration detection data GSI is supplied from the associated A/D converter, a mean value arithmetic module 23 for cumulating 256 times the discrete values of the acceleration detection data GSI supplied from the A/D converter via the input terminal 22 and deriving a mean value of the acceleration detection data GSI by dividing the cumulated value by a factor of "256", a switch module 24 operated by a switching signal supplied from a condition decision module 25, the functions of which will be elucidated hereinafter by reference to FIG. 4.

The offset eliminating function block 21 further includes a filter module 26 which serves for filtering the mean value signal GS1 outputted from the mean value arithmetic module 23 for smoothing the signal GS1 while eliminating disturbance components, a clipper or clamp module 27 for clipping the filter output GS2 to derive the offset GS0, an adder module 28 for subtracting the offset value GS0 outputted by the clip module 27 from the acceleration detection data GSI inputted via the input terminal 22, and an output terminal 29 for supplying the output of the adder module 28, i.e., the vehicle acceleration GB to other function blocks of the microcomputer 5A which partake in the anti-skid control described hereinbefore.

Description will now turn to operations of the function block shown in FIG. 3.

The acceleration detection data GSI inputted via the input terminal 22 is sampled at 256 discrete time points and cumulated by the mean value arithmetic module 23 (i.e., a digital integration), whereon the resultant sum value is divided by the factor of "256" to thereby derive the mean acceleration value GS1 of the acceleration data. On the other hand, the condition decision module 25 decides whether or not the learning conditions (a) to (e) elucidated later on are satisfied at each of 256 discrete sampling time points (i.e., during a period corresponding to 256 counts). When the answer of this decision is affirmative, the condition decision module 25 issues a switching signal to the switch module 24 which is then closed. In this manner, every time the learning conditions are satisfied 256 sampling times, the switch module 24 is closed.

When the switch 24 is closed, the acceleration detection data GS1 outputted from the mean value arithmetic module 23 is supplied to the filter module 26 to undergo the filtering. In this case, an updated filter output GS2N is generated in accordance with the following expression:

$$GS2N=(K1\cdot GS2M+K2\cdot GS2L)/(K1+K2) \quad (1)$$

where GS2L represents the mean acceleration value determined and fetched in the preceding cycle and GS2M represents the means acceleration value inputted newly.

The output GS2 of the filter module 26 is supplied to the clipper module 27 which clips or clamps the value of the output GS2 of the filter module 26 to a range of values which the offset quantity for the acceleration sensor 2 should assume in the normal state thereof when the learning conditions mentioned hereinafter are satisfied.

Through the sequence of processings described above, the offset quantity GS0 for the acceleration sensor 2 is fetched or learned and stored in a memory (not shown) incorporated in the microcomputer 5A.

In the succeeding anti-skid control steps, the value obtained by subtracting the offset value GS0 stored in the memory from the detection data GSI outputted from the A/D converter is used as the vehicle acceleration GB. More specifically, the output of the clipper or clamp module 27 (i.e., the offset value GS0) is supplied to the adder module 28 to be subtracted from the acceleration detection data GSI supplied via the input terminal 22. The output of the adder module 28 (i.e., the vehicle acceleration signal GB) is supplied to other function blocks of the microcomputer 5A via the output terminal 29.

Parenthetically, it should be mentioned that the memory for storing the offset value GS0 is implemented as a nonvolatile memory which can hold the stored data even when the power supply is turned off. It is further assumed that the content of this nonvolatile memory is initialized to the state where the offset quantity is zero until the learning conditions are satisfied.

The learning conditions are set as follows:

Condition (a): acceleration or deceleration GW of the wheel is not greater than a predetermined value.

Condition (b): difference in the wheel speed VW among four wheels is not greater than a predetermined value (i.e., the four wheels are at a substantially same speed).

Condition (c): magnitude of change in the wheel speed VW remains smaller than a predetermined value over the period TL of 256 counts.

Condition (d): magnitude of change in the detection data (digital data) outputted from the A/D converter remains smaller than a predetermined value for the period TL of 256 counts.

Condition (e): wheel speeds VW are higher than a predetermined value.

With the offset value or quantity of the acceleration sensor 2, it is to mean the output value of the acceleration sensor 2 when the acceleration is zero, i.e., when the motor vehicle is making a straight drive at a constant speed on a level ground. The driving or running states of the motor vehicle can be detected by determining whether or not the conditions (a) to (e) are satisfied.

When the condition (a) is satisfied, this means that the wheels rotate approximately at a constant speed. More specifically, when the motor vehicle runs at a remarkably high acceleration or deceleration, there occurs a slip of the wheel (due to difference between the wheel speed and the vehicle speed), which means that the wheel speed does not reflect the vehicle speed. Accordingly, learning in the state where the acceleration or deceleration of the wheel exceeds a predetermined level is inhibited in view of this condition (a).

With the terms "predetermined value" employed in the condition (a), it is intended to mean ideally zero. In practice, however, the wheel acceleration signals GW may assume other value than zero due to external disturbances. Accordingly, the above-mentioned predetermined value should preferably be set to a value determined in consideration of the external disturbances.

Next, by making reference to the condition (b), it is decided whether or not the motor vehicle is running straight on the level ground. By way of example, in the up-hill driving, the speed of the driving wheels will differ from that of the follower wheels. Further, difference in speed is observed between the left and right wheels when the motor vehicle is turned clockwise or counterclockwise. Accordingly, by checking whether the condition (b) is satisfied or not, it is possible to detect whether the motor vehicle makes a straight drive on the level ground.

Subsequently, by checking whether or not the conditions (c) and (d) are satisfied, it is determined whether or not the motor vehicle is driven at a constant speed. As mentioned above, the constant-speed running state of the motor vehicle can be determined by checking whether the aforementioned condition (a) is satisfied or not. However, in practical application, it is difficult to decide whether the condition (a) applies valid when the motor vehicle is accelerated or decelerated at an extremely low rate. Accordingly, the condition (d) is set for determining whether the motor vehicle is in the state accelerated or decelerated at a very small rate by detecting whether or not the wheel speed signals VW and the acceleration detection data GSI derived from the output of the acceleration sensor 2 are substantially at constant rate for the predetermined period TL.

The condition (e) is provided for detecting whether or not the motor vehicle is running at a speed higher than a predetermined value. By way of example, when the motor vehicle is driven in urban districts, acceleration and deceleration may frequently be repeated. Accordingly, the learning in such situation is inhibited by providing the condition (e).

Next, a procedure for learning the offset quantity will be described by reference to a flow chart shown in FIG. 4. This procedure is executed in the step S10 shown in FIG. 2.

Referring to FIG. 4, in a step S11, a counter (not shown) incorporated in the microcomputer 5A for counting the number of "256" is started. Subsequently, in a step S12, the GSI outputted from the A/D converter is cumulated, whereupon the processing proceeds to a step S13.

In the step S13, it is decided whether or not the aforementioned learning conditions (a) to (e) are satisfied. If so, the processing proceeds to a step S17. If otherwise, the counter is reset in a step S15, which is followed by a step S16 where the cumulated value is also reset.

In the step S17, it is decided whether the count value of the counter has reached "256". If the answer of this decision step S17 is affirmative (YES), the processing proceeds to a step S18, while if otherwise (NO), to a step S21.

In the step S18, the filtering processing is performed on the conditions that the learning conditions mentioned previously have successively been satisfied 256 times. In a following step S19, the clipping or clamping processing is performed. In a step S20, the offset quantity GS0 obtained through the clip or clamp processing is stored in the memory, whereupon the processing proceeds to the step S21.

In the step S21, the offset value GS0 is subtracted from the detection data GSI outputted from the A/D converter to thereby obtain the vehicle acceleration GB which is used in the anti-skid control.

As is apparent from the foregoing description, according to the invention incarnated in the illustrated embodiment, the vehicle acceleration detection data outputted from the A/D converter undergoes the filtering processing and the clamp processing to obtain the offset value GS0 for the acceleration sensor 2 provided that the predetermined learning conditions (a) to (e) enumerated hereinbefore remain satisfied for a predetermined temporal period (corresponding to "256" counts). The vehicle acceleration GB is then obtained by subtracting the offset value GSO thus determined from the vehicle acceleration data derived from the output of the acceleration sensor 2. The vehicle acceleration GB is then used in the anti-skid control, which is thus protected against influence of the offset applied to the output signal of the acceleration sensor 2, whereby an improved anti-skid control performance can be realized.

Embodiment 2

Figure 5:
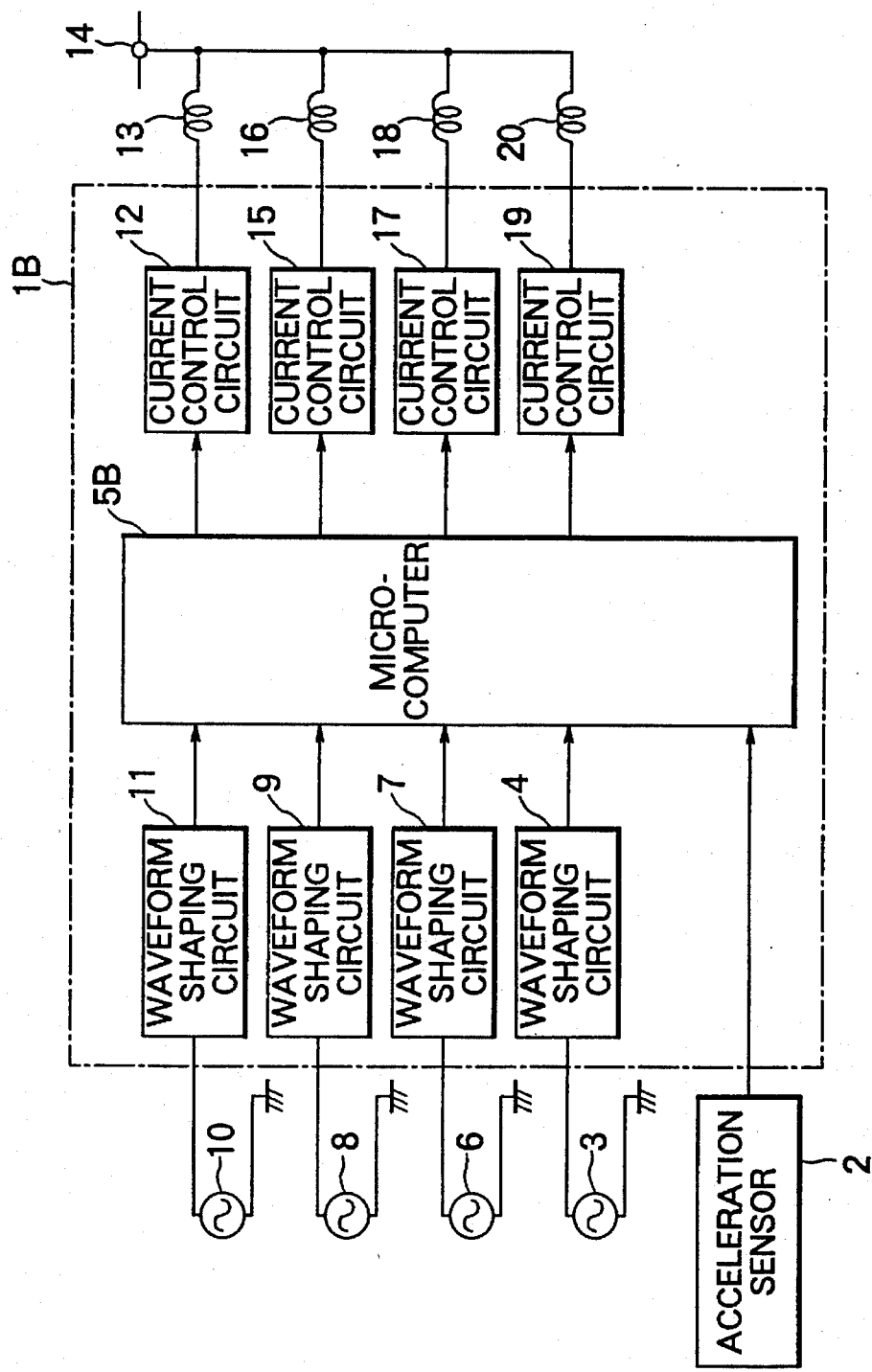
FIG. 5 is a schematic block diagram showing generally a structure of an anti-skid control apparatus according to a second embodiment which incarnates the second aspect of the invention.
Figure 10:
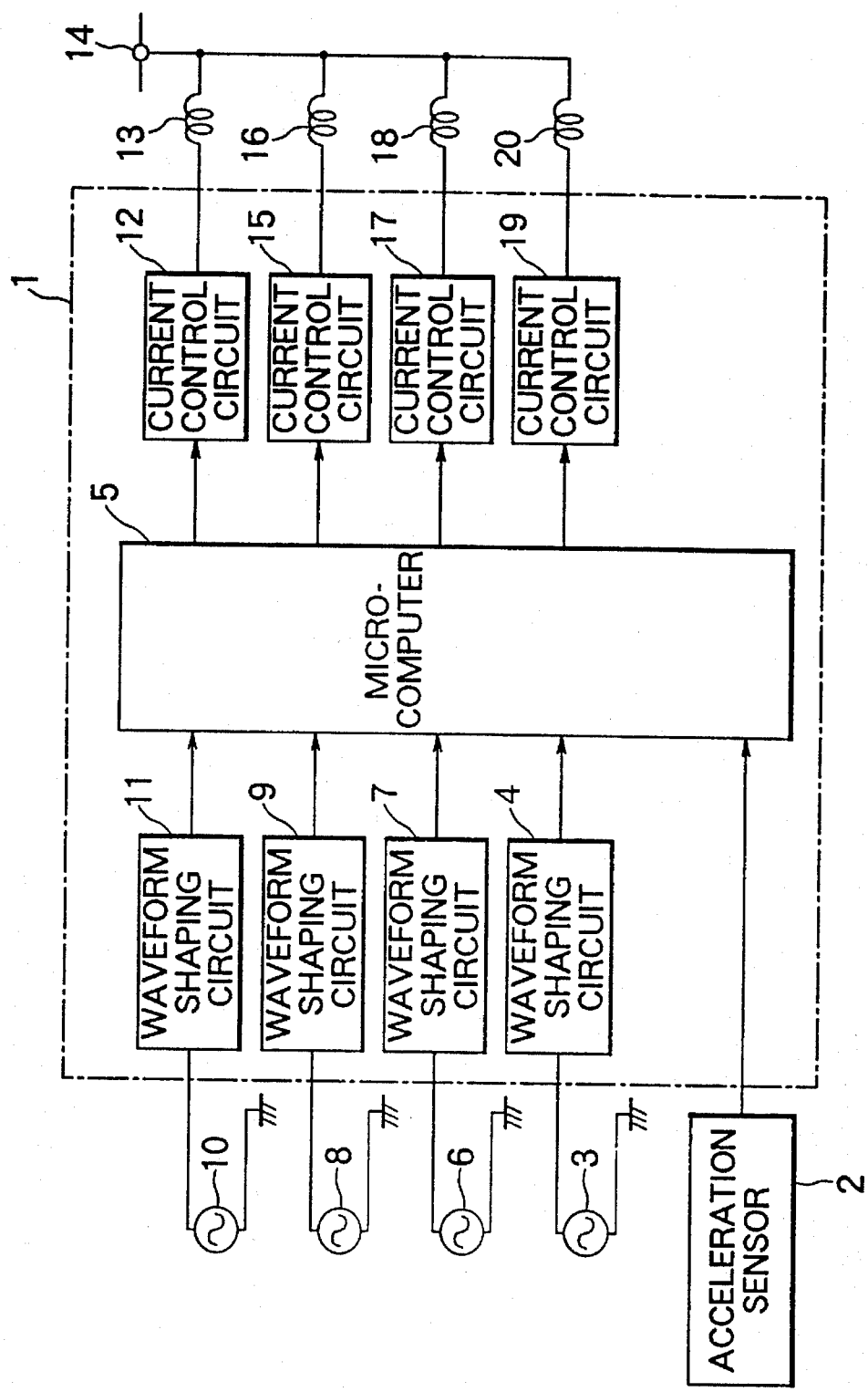
FIG. 10 is a schematic block diagram showing a typical structure of an anti-skid control apparatus known heretofore.
Figure 11:
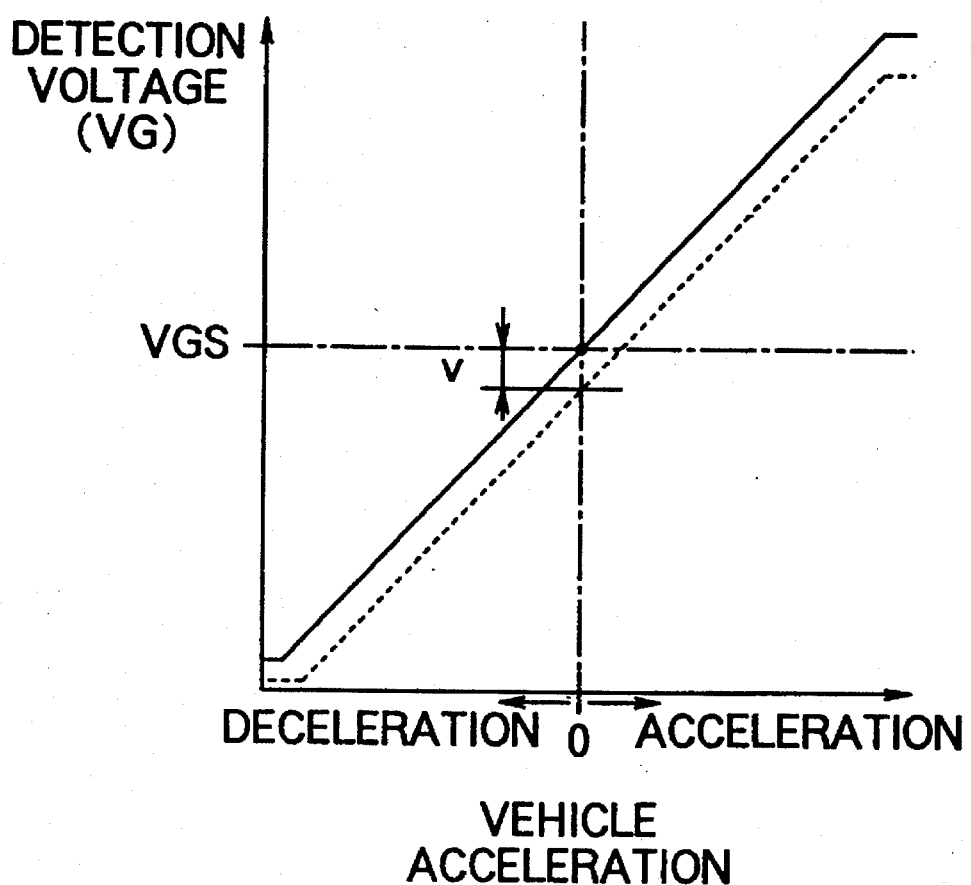
FIG. 11 is a characteristic diagram for graphically illustrating a relation between a detection voltage of an acceleration sensor and acceleration of a motor vehicle.
Figure 12:
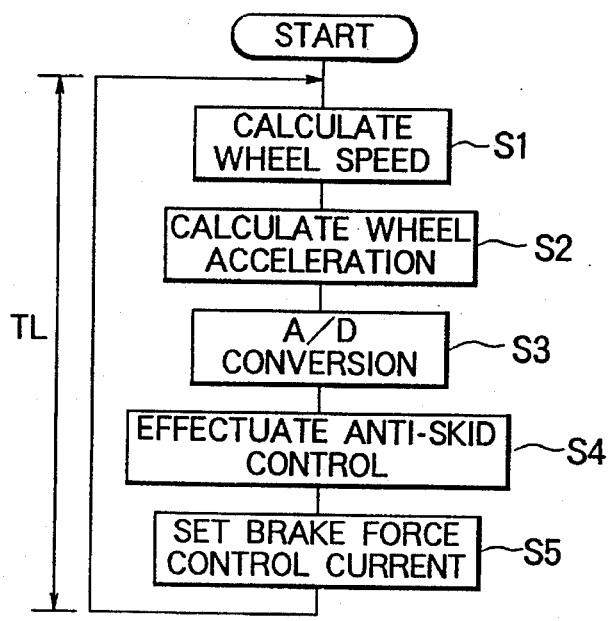
FIG. 12 is a flow chart for illustrating operation of the conventional anti-skid control apparatus shown in FIG. 10.
Figure 13:
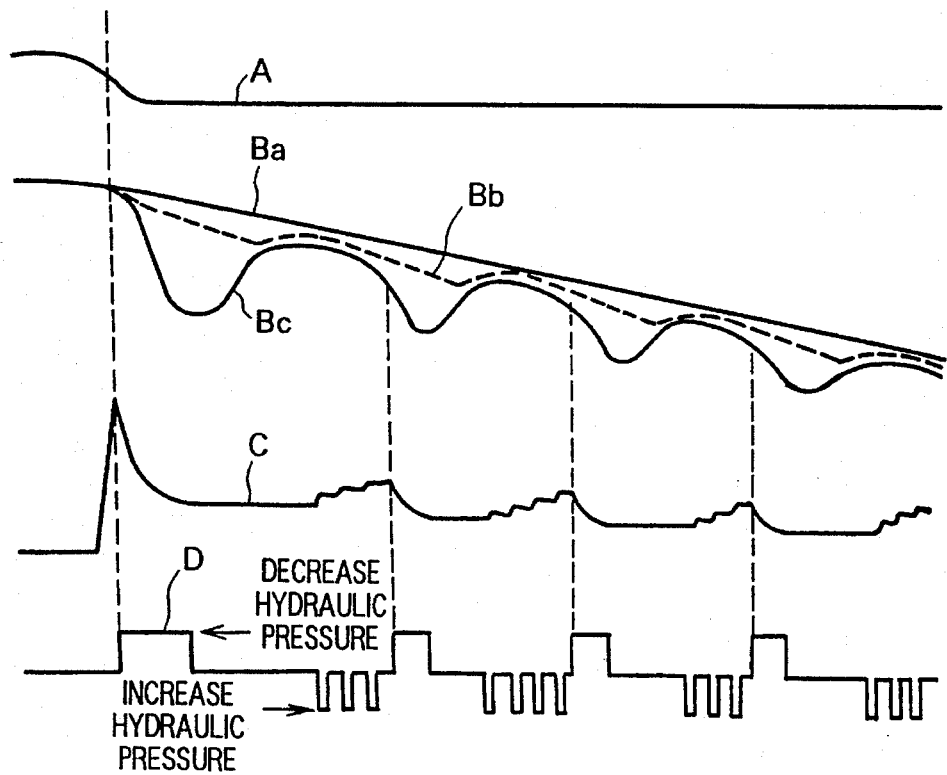
FIG. 13 is a waveform diagram for illustrating a typical example of the anti-skid control.

A second embodiment according to the second aspect of the invention will be described. FIG. 5 is a schematic block diagram showing generally a structure of an anti-skid control apparatus according to the second embodiment. In the figure, parts same as or equivalent to those described hereinbefore by reference to FIGS. 1 and 10 are denoted by like reference numerals, and repeated description thereof is omitted. The controller generally denoted by reference character 1B is comprised of a microcomputer 5B, the waveform shaping circuits 4, 7, 9 and 11 and the current control circuits 12, 15, 17 and 19, wherein the microcomputer 5B is so programmed as to effectuate the anti-skid control in accordance with the second aspect of the invention.

Figure 6:
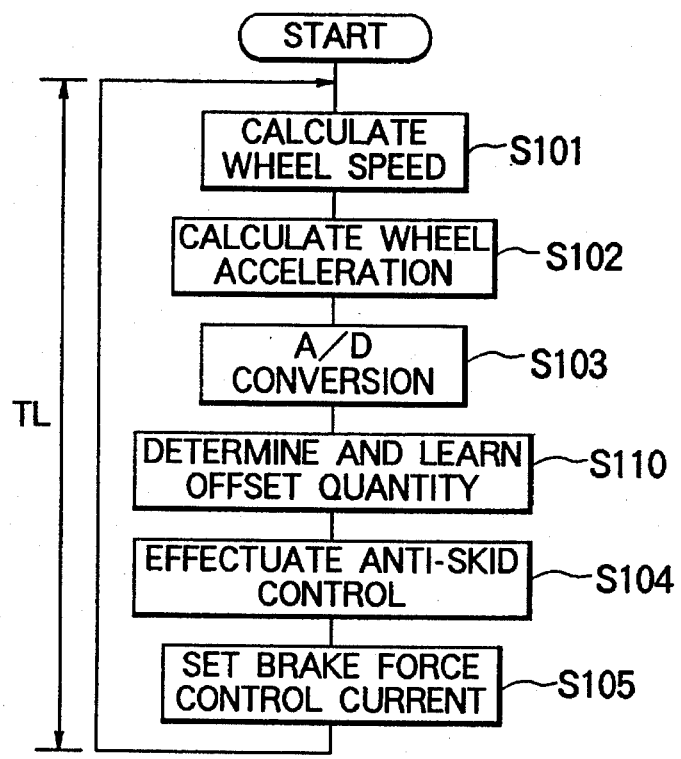
FIG. 6 is a flow chart for illustrating operation of the anti-skid control apparatus shown in FIG. 5.

Next, referring to a flow chart of FIG. 6, description will be made of operation of the anti-skid control apparatus shown in FIG. 5.

In the course of running of the motor vehicle, the acceleration thereof is detected by the acceleration sensor 2. The detected vehicle acceleration GB is supplied to the microcomputer 5B. At the same time, the wheel speed sensors 3, 6, 8 and 10 generate the sinusoidal waveform signals having frequencies representing the wheel speeds VW of the associated wheels, respectively, which signals are converted to corresponding pulse waveform signals through the waveform shaping circuits 4, 7, 9 and 11, respectively, and then supplied to the microcomputer 5B.

In a step S101, the microcomputer 5B calculates the wheel speeds VW. More specifically, in the step S101, the microcomputer 5B arithmetically determines the periods of the pulse signals supplied from the waveform shaping circuits 4, 7, 9 and 11, respectively, by activating a correspondingly programmed interrupt routine (not shown), to thereby calculate the wheel speeds VW in terms of the reciprocals of the periods as determined, respectively.

Subsequently, in a step S102, differences between the wheel speeds VW calculated currently in the step S101 and the wheel speeds determined in the preceding cycle are determined to thereby compute the wheel accelerations GW. Then, the processing proceeds to a step S103 in which the detection voltage VG generated by the acceleration sensor 2 is converted into digital data through an analogue-to-digital (A/D) converter (not shown), the digital data being fetched by the microcomputer 5B, whereupon the processing proceeds to a step S110.

In the step S110, an offset quantity GS0 is determined on the basis of the detection data outputted from the A/D converter, i.e., the acceleration detection data GSI, as well as the wheel speeds VW and the wheel accelerations GW, as described in more detail later on, whereupon the vehicle acceleration GB is determined by subtracting the offset GS0 from the input acceleration data GSI.

In a step S104, it is determined whether the brake oil pressure P is to be increased or decreased or alternatively to be held at the current level on the basis of the wheel speeds VW, the wheel accelerations GW and the vehicle acceleration GB in accordance with a predetermined algorithm, whereupon the processing proceeds to a step S105.

In the step S105, current command signals are generated to the current control circuits 12, 15, 17 and 19, respectively, in accordance with the results of the processing step S104. Thus, the electric currents of the values designated by the command signals mentioned above are supplied to the solenoids 13, 16, 18 and 20 from the power supply source 14, whereby the brake oil pressure P of the hydraulic brake system (not shown) is increased, decreased or held as it is. Thus, the anti-skid control is effectuated. The routine including the processing steps S101, S102, S103, S110, S104 and S105 is cyclically or periodically executed at a predetermined time interval TL.

Figure 7:
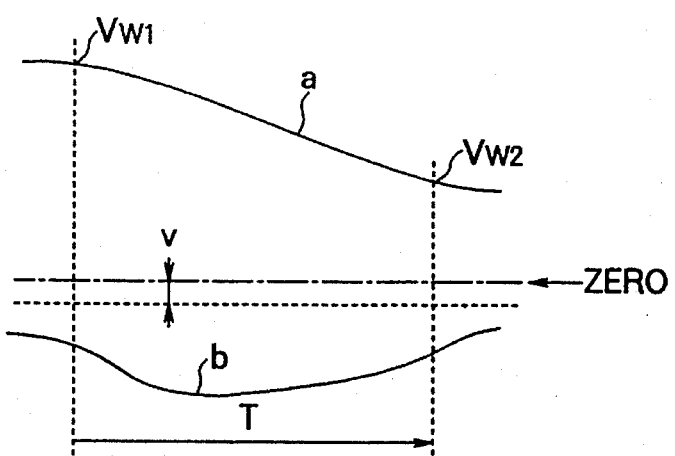
FIG. 7 is a diagram for illustrating the principle for removing an offset in accordance with the second embodiment.

Next, description will be directed to a method of deriving the offset from the output signal of the acceleration sensor 2 by reference to FIG. 7.

In FIG. 7, a solid line curve a represents the wheel speed VW, and a solid line curve b represents the detection voltage VG outputted from the acceleration sensor 2 and containing the offset quantity v. Now, it is assumed that the wheel speed VW changes from a value VW1 to VW2. In that case, the following equation applies valid since the speed is obtained by integrating the acceleration:

$$K \int_0^T (VG-v)dt = VW2-VW1 \qquad (2)$$

In the above expression, K represents a constant for matching the dimensions of the left- and right-hand sides. Since the offset quantity v is constant independent of time, the equation (2) can be rewritten as follows:

$$K \int_0^T VGdt - KvT = VW2-VW1 \qquad (3)$$

Thus, the offset quantity v can be determined in accordance with the following expression:

$$v = (\int_0^T VGdt)/T - (VW2-VW1)/KT \qquad (4)$$

As is apparent from the above expression, the offset quantity v can be obtained by subtracting the rate of change of the wheel speed VW taking place during a predetermined period from a mean value obtained by averaging the detection output of the acceleration sensor 2 over the predetermined period mentioned above.

Figure 8:
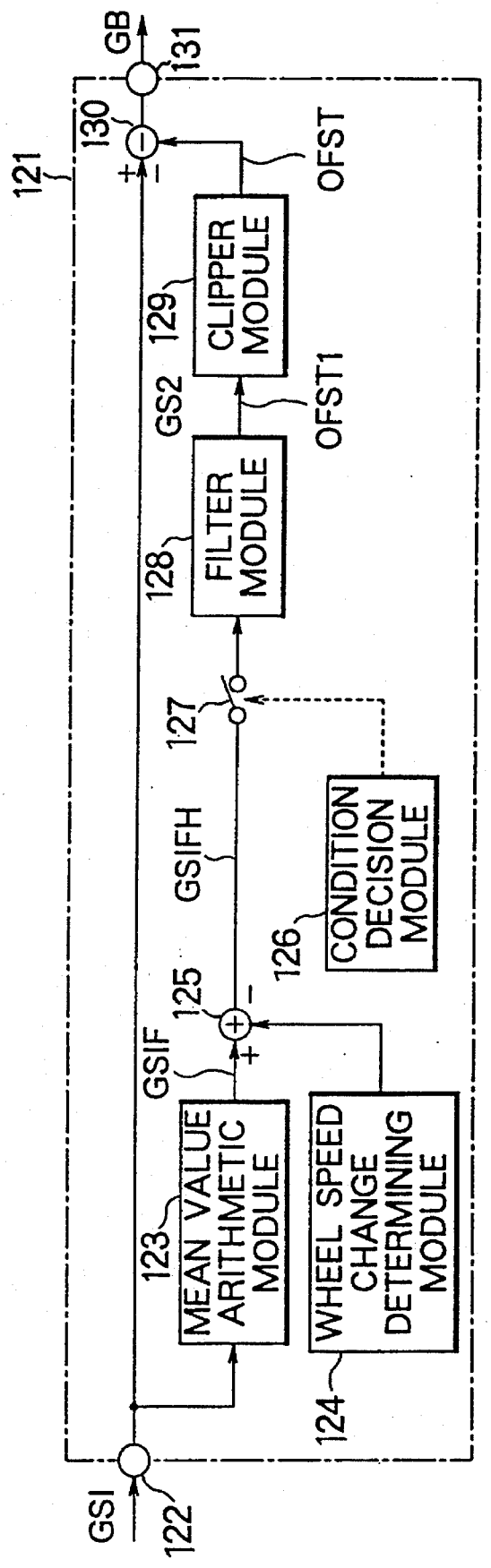
FIG. 8 is a block diagram showing a functional configuration of a microcomputer constituting a major part of the anti-skid control apparatus according to the of the second embodiment of the invention.

Now, description will turn to a method of eliminating the offset quantity. Referring to FIG. 8, an offset eliminating function block generally designated by a reference numeral 121 includes an input terminal 122 to which the acceleration detection data GSI is supplied from the associated A/D converter, a mean value arithmetic module 123 for cumulating 256 times the discrete values of the acceleration detection data GSI supplied from the A/D converter via the input terminal 122 and deriving a mean value of the acceleration detection data GSI by dividing the cumulated value by a factor of "256", a wheel speed change arithmetic module 124 for determining a rate of change in the wheel speed VW which occurred during a predetermined time corresponding to the period covering the 256 sampling time points, an addition module 125 for subtracting from the mean value GSIF outputted from the mean value arithmetic module 123 the rate of change of the wheel speed to thereby obtain a value GSIFH, and a switch module 127 operated by a switching signal supplied from a condition decision module 126, the functions of which will be elucidated hereinafter by reference to FIG. 9.

The offset eliminating function block 21 further includes a filter module 128 which serves for smoothing the mean value signal GSIFH supplied from the addition module 125 via the switch module 127 in a manner elucidated hereinafter (see expression (5)), a clipper or clamp module 129 for clamping the filter output OFST to thereby derive the offset OFST while suppressing the spurious components, an adder module 130 for subtracting the offset value OFST outputted by the clip module 129 from the acceleration detection data GSI inputted via the input terminal 122, and an output terminal 131 for supplying the output of the adder module 130, i.e., the vehicle acceleration GB to other function blocks of the microcomputer 5B which partake in the anti-skid control described hereinbefore.

Description will now turn to operations of the function block shown in FIG. 8.

The acceleration detection data GSI inputted via the input terminal 122 is sampled at 256 discrete time points and cumulated by the mean value arithmetic module 123 (i.e., a digital integration), whereon the resultant sum value is divided by the factor of "256" to thereby derive the mean acceleration value GSIF of the acceleration data GSI. On the other hand, the wheel speed change arithmetic module 124 determines the rate of change of the wheel speed during the period TL corresponding to the 256 time period points. The addition module 125 subtracts the rate of change of the wheel speed change from the mean value GSIF outputted from the mean value arithmetic module 123 to thereby obtain value GSIFH. The condition decision module 126 decides whether or not the learning conditions (a) to (d) elucidated later on are satisfied at each of 256 discrete sampling time points (i.e., during the period TL corresponding to 256 counts of a counter described hereinafter). When the answer of this decision is affirmative, the condition decision module 126 issues a switching signal to the switch module 127 which is then closed. In this manner, every time the learning conditions (a) to (d) are successively satisfied 256 sampling times, the switch module 127 is closed.

When the switch module 127 is closed, the acceleration detection data GSIFH outputted from the addition module 125 is supplied to the filter module 128 to undergo the filtering. In this case, an updated filter output $OFST1_N$ is generated in accordance with the following expression:

$$OFST1_N = (K1 \cdot OFST1_L + K2 \cdot GSIFH)/(K1+K2) \quad (5)$$

where $OFST1_L$ represents the filter output obtained in the preceding cycle and GSIFH represents the value inputted newly.

The output OFST1 of the filter module 128 is supplied to the clamp module 129 which clips or clamps the value of the output OFST1 of the filter module 128 to a range of values which the offset quantity for the acceleration sensor 2 should assume in the normal state thereof when the learning conditions mentioned hereinafter are satisfied.

Through the sequence of processings described above, the offset quantity OFST of the acceleration sensor 2 is fetched or learned and stored in a memory (not shown) incorporated in the microcomputer 5B of FIG. 5.

In the succeeding anti-skid control steps, the value obtained by subtracting the offset value OFST stored in the memory from the detection data GSI outputted from the A/D converter is used as the vehicle acceleration GB. More specifically, the output of the clipper or clamp module 129 (i.e., the true offset value OFST of the acceleration sensor 2) is supplied to the adder module 130 to be subtracted from the acceleration detection data GSI supplied via the input terminal 122. The output of the adder module 130 (i.e., the vehicle acceleration signal GB) is supplied to other function blocks of the microcomputer 5B via the output terminal 131.

Parenthetically, it should be mentioned that the memory for storing the offset value OFST is implemented as a nonvolatile memory which can hold the stored data even when the power supply is turned off. It is further assumed that the content of this nonvolatile memory is initialized so that the offset quantity is zero so long as the learning conditions are not satisfied.

The learning conditions (a) to (d) mentioned previously are set as follows:

Condition (a): acceleration or deceleration GW of each wheel does not exceed a predetermined value.

Condition (b): difference in the wheel speed VW among four wheels does not exceed a predetermined value (i.e., the four wheels are at a substantially same speed).

Condition (c): the wheel speed VW continuously remains not smaller than a predetermined value.

Condition (d): motor vehicle is in the two-wheel driving state.

The reason why the conditions mentioned above are set is to determine the vehicle acceleration on the basis of the change in the wheel speed VW and then determine the offset value of the acceleration sensor 2 by subtracting the vehicle acceleration from the detection value outputted from the acceleration sensor 2. Accordingly, it is required to execute the offset learning procedure when the motor vehicle is making a straight drive at a constant speed on a level ground. This driving state of the motor vehicle can be detected by determining whether the conditions (a) to (d) mentioned above are satisfied or not.

When the condition (a) is satisfied, this means that the wheels rotate approximately at a constant speed. More specifically, when the motor vehicle runs at a remarkably high acceleration or deceleration, there occurs a slip of the wheel (due to difference between the wheel speed and the vehicle speed), which means that the wheel speed does not reflect the vehicle speed. Accordingly, learning in the state where the acceleration or deceleration of the wheel exceeds a predetermined level is inhibited in view of this condition (a).

With the terms "predetermined value" employed in the condition (a), it is intended to ideally mean zero. In practice, however, the wheel acceleration signals GW may assume other value than zero even in the constant-speed running state due to various external disturbances. Accordingly, the above-mentioned predetermined value should preferably be set to a value determined in consideration of the external disturbances.

Next, by making reference to the condition (b), it is decided whether or not the motor vehicle is running straight on the level ground. By way of example, in the up-hill driving, the speed of the driving wheels will differ from that of the follower wheels. Further, difference in speed is observed between the left and right wheels when the motor vehicle is turned clockwise or counterclockwise. Accordingly, by checking whether the condition (b) is satisfied or not, it is possible to detect whether the motor vehicle makes a straight drive on the level ground.

In the four-wheel driving state of the motor vehicle (i.e., in the state where the four-wheels are driven mutually under constraint), the condition (b) does not apply valid. Accordingly, the condition (d) is set for inhibiting the learning process in the four-wheel driving state.

The condition (c) is provided for detecting whether or not the motor vehicle is running at a speed not lower than a predetermined value (e.g., a cruising speed). By way of example, when the motor vehicle is driven in urban districts, acceleration and deceleration may frequently be repeated. Accordingly, the learning in such situation should preferably be inhibited by providing the condition (c).

Next, a procedure for learning the offset quantity will be described by reference to a flow chart shown in FIG. 9. This procedure is executed in the step S110 shown in FIG. 6.

Figure 9:
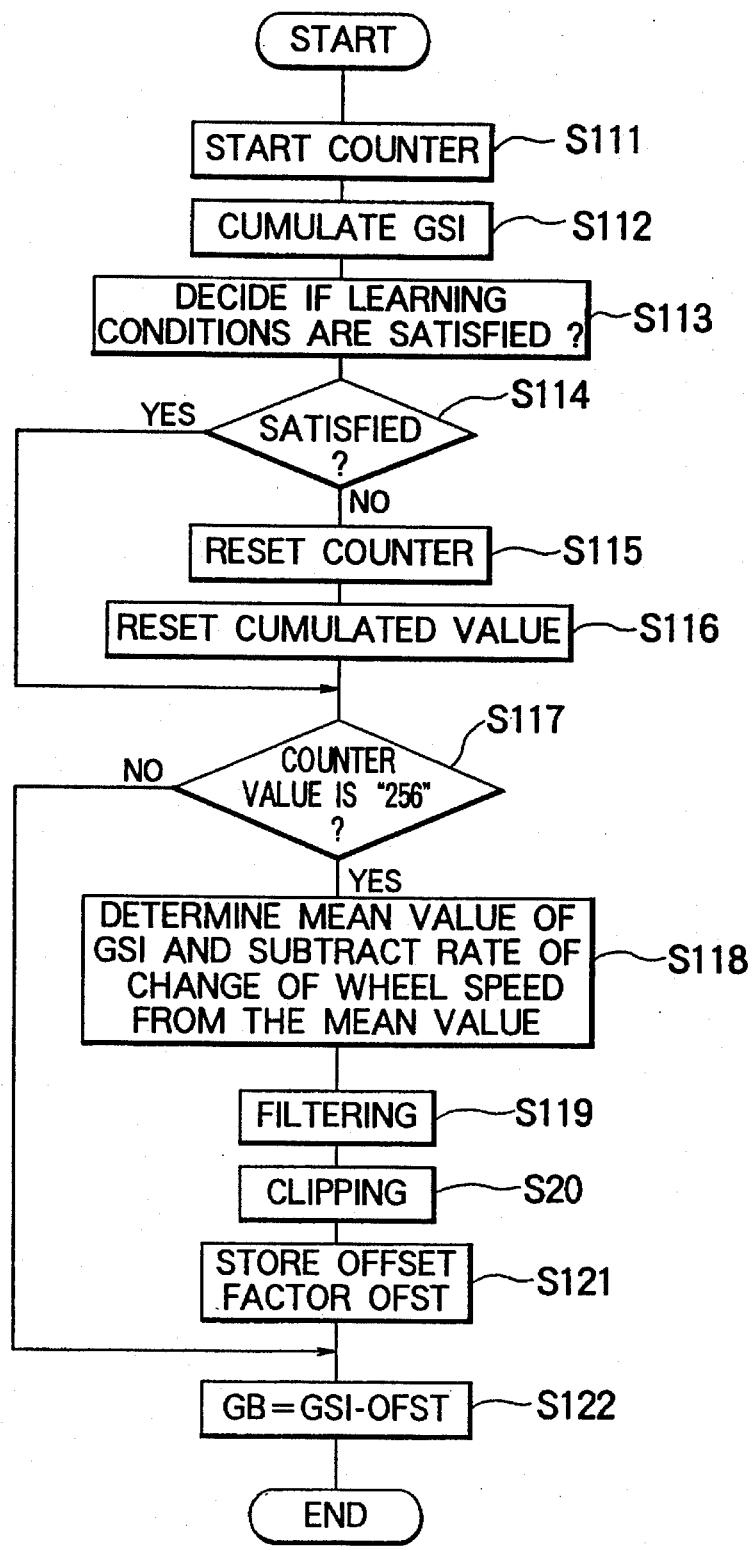
FIG. 9 is a flow chart for illustrating a routine processing executed by the microcomputer in a step (S110) shown in FIG. 6.

Referring to FIG. 9, in a step S111, a counter (not shown) incorporated in the microcomputer 5B for counting the number of "256" is started. Subsequently, in a step S112, the GSI outputted from the A/D converter is cumulated, whereupon the processing proceeds to a step S113.

In the step S113, it is decided whether or not the aforementioned learning conditions (a) to (d) are satisfied. If so, the processing proceeds to a step S117. If otherwise, the counter is reset in a step S115, which is followed by a step S116 where the cumulated value is also reset. In the step S117, it is decided whether the count value of the counter has reached "256". If the answer of this decision step S117 is affirmative (YES), indicating that the learning conditions (a) to (d) are satisfied successively at the 256 sampling time points, the processing proceeds to a step S118, while if otherwise (NO), to a step S122.

In the step S118, the rate of change of the wheel speed VW during the period TL corresponding to the 256 sampling time points is subtracted from the value obtained by dividing the cumulated value of the vehicle acceleration by 256, whereupon the processing proceeds to a steps 120 where the clipping or clamping processing is performed. In a next step S121, the offset quantity OFST of the acceleration obtained through the clip or clamp processing is stored in the memory, and then the processing proceeds to a step S122.

In the step S122, the offset value OFST is subtracted from the detection data GSI outputted from the A/D converter to thereby obtain the vehicle acceleration GB which is used in the anti-skid control.

As is apparent from the foregoing description, according to the invention incarnated in the second embodiment, the value obtained from subtraction of the change of the wheel speed from the mean value of the vehicle acceleration detection data outputted from the A/D converter undergoes the filtering processing and the clamp processing to thereby obtain the offset value OFST for the acceleration sensor 2 only when the predetermined learning conditions (a) to (d) enumerated hereinbefore remain satisfied continuously for a predetermined temporal period (corresponding to "256" counts). The vehicle acceleration GB is then obtained by subtracting the offset value OFST thus determined from the vehicle acceleration data derived from the output of the acceleration sensor 2. The vehicle acceleration GB is then converted to the vehicle speed through integration to be used in the anti-skid control, which is thus protected against influence of the offset applied to the output signal of the acceleration sensor 2, whereby an improved anti-skid control performance can be realized.

The many features and advantages of the present invention are apparent from the detailed description and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to, falling within the scope of the invention.

We claim:

1. An apparatus for determining acceleration of a motor vehicle, comprising:

an acceleration sensor for generating a signal representing acceleration of said motor vehicle;

wheel speed sensor means for generating wheel speed signals indicating wheel speeds of individual wheels of said motor vehicle;

a first module for determining a mean value of the output signal of said acceleration sensor over a predetermined period in the running state of said motor vehicle during which said motor vehicle is determined, by reference to said wheel speed sensor means, to be making a substantially straight drive at a substantially constant speed on a substantially level ground surface, to thereby output a signal indicating an offset factor of said acceleration sensor; and a second module for determining acceleration of said motor vehicle during operation periods subsequent to said predetermined period by subtracting said offset factor from the output of said acceleration sensor to generate a signal representing the corrected acceleration.

2. An acceleration determining apparatus for a motor vehicle according to claim 1, wherein said mean value of the output of said acceleration sensor is determined in the state where at least undermentioned conditions (a) to (c) are continuously satisfied during said period:

(a) accelerations of said wheels determined on the basis of said wheel speeds are not greater than a predetermined value;

(b) difference in the wheel speed among said individual wheels is not greater than a predetermined value; and (c) said wheel speed is continuously higher than a predetermined value.

3. An acceleration determining apparatus for a motor vehicle according to claim 2, wherein said predetermined values used in said conditions (a) and (b) are so selected as to correspond to approximately zero output of said acceleration sensor.

4. An acceleration determining apparatus for a motor vehicle according to claim 2, wherein said predetermined values used in said condition (c) is so selected as to substantially correspond to a cruising speed of said motor vehicle.

5. An apparatus for determining acceleration of a motor vehicle, comprising:

acceleration sensor for generating a signal representing vehicle acceleration of said motor vehicle;

wheel speed sensor means for detecting speeds of individual wheels of said motor vehicle;

first module for determining as an offset quantity a mean value of the output of said acceleration sensor over a predetermined period on the condition that (a) accelerations or decelerations of said wheels as determined on the basis of the wheel speeds detected by said wheel speed sensor, (b) differences in the wheel speed among different wheels, change in the wheel speed of each of said wheels and change in the output of said acceleration sensor are continuously maintained smaller than respective predetermined values during said predetermined period, and that (c) the wheel speed of each of said wheels is continuously greater than a predetermined value during said predetermined period; and second module for determining acceleration of said motor vehicle by subtracting said offset quantity from the output of said acceleration sensor means.

6. An acceleration determining apparatus for a motor vehicle according to claim 5, wherein said offset quantity value of the output of said acceleration sensor is determined cyclically when said conditions (a) to (c) are satisfied, and further comprising:

storage means for storing said offset value and updating said offset value whenever said mean value is newly determined.

7. An apparatus for determining acceleration of a motor vehicle, comprising:

acceleration sensor for generating a signal representing acceleration of said motor vehicle;

wheel speed sensor means for generating wheel speed signals indicating wheel speeds of individual wheels of said motor vehicle;

first arithmetic module for determining a mean value of the output signal of said acceleration sensor over a predetermined period when the condition that said motor vehicle is making a substantially straight drive at a substantially constant speed on a substantially level ground surface during said predetermined period is continuously satisfied during said predetermined period;

second arithmetic module for determining a vehicle acceleration on the basis of changes in the wheel speeds during said predetermined period;

third arithmetic module for subtracting said vehicle acceleration outputted from said second arithmetic module from said mean value outputted from said first arithmetic module;

hold means for holding a value outputted from said third arithmetic module as an offset quantity; and fourth arithmetic module for determining acceleration of said motor vehicle by subtracting said offset quantity from the output of said acceleration sensor.

8. An acceleration determining apparatus for a motor vehicle according to claim 7, wherein said mean value of the output of said acceleration sensor is determined in the state where at least undermentioned conditions (a) to (c) are continuously satisfied during said period:

(a) accelerations of said wheels are not greater than a predetermined value;

(b) difference in the wheel speed among said individual wheels is not greater than a predetermined value; and (c) said wheel speed is continuously higher than a predetermined value.

9. A method of determining acceleration of a motor vehicle, comprising the steps of:

(1) detecting acceleration of said motor vehicle using an acceleration sensor;

(2) detecting wheel speeds of individual wheels of said motor vehicle using wheel speed sensors;

(3) determining a mean value of said detected acceleration over a predetermined period in a state where the following conditions (a) to (c) are continuously satisfied during said predetermined period:

(a) accelerations of said wheels as determined on the basis of the detected wheel speeds are not greater than a predetermined value;

(b) differences in the wheel speed among said individual wheels are not greater than a predetermined value; and (c) said wheel speeds are continuously higher than a predetermined value;

(4) extracting an offset quantity based on said mean value; and (5) determining acceleration of said motor vehicle by subtracting said offset quantity from the acceleration actually detected by said acceleration sensor during operation periods subsequent to said predetermined period.

10. A method of determining acceleration of a motor vehicle, comprising the steps of:

(1) detecting vehicle acceleration of said motor vehicle by an acceleration sensor;

(2) detecting speeds of individual wheels of said motor vehicle by wheel speed sensors; and (3) determining a mean value of the output of said detected acceleration of said motor vehicle over a predetermined period in the state where undermentioned conditions (a) to (c) are continuously satisfied during said period;

(a) accelerations of said wheels are not greater than a predetermined value;

(b) difference in the wheel speed among said individual wheels is not greater than a predetermined value; and (c) said wheel speed is continuously higher than a predetermined value;

(4) determining a vehicle acceleration on the basis of changes in the wheel speeds during said predetermined period;

(5) subtracting said vehicle acceleration outputted from step (4) from said mean value outputted from said step (3);

(6) storing a value contained from said subtraction as an offset quantity; and (7) determining acceleration of said motor vehicle during a period subsequent to said predetermined period by subtracting said offset quantity from the acceleration actually detected by said acceleration sensor.

11. An anti-skid control apparatus for a motor vehicle for controlling braking forces applied to individual wheels of the motor vehicle on the basis of differences between a vehicle speed and wheel speeds in order to prevent skid of the wheels relative to the ground surface, comprising:

an acceleration sensor for detecting acceleration of said motor vehicle;

wheel speed sensors for detecting wheel speeds of individual wheels of said motor vehicle; and a controller for controlling braking forces to be applied to said wheels, respectively, on the basis of differences between a vehicle speed of said motor vehicle and said wheel speeds;

wherein said controller includes:

means for determining a mean value of the output of said acceleration sensor over a predetermined period when the condition that said motor vehicle is making a substantially straight drive at a substantially constant speed on a substantially level ground surface during said predetermined period is continuously satisfied during said predetermined period; and means for determining said vehicle speed of said motor vehicle during periods subsequent to said predetermined period on the basis of a value obtained by subtracting said mean value from the output of said acceleration sensor.

12. An anti-skid control apparatus for a motor vehicle according to claim 11, wherein said mean value of the output of said acceleration sensor is determined in the state where at least undermentioned conditions (a) to (c) are continuously satisfied during said period:

(a) accelerations of said wheels are not greater than a predetermined value;

(b) difference in the wheel speed among said individual wheels is not greater than a predetermined value; and (c) said wheel speed is continuously higher than a predetermined value.

13. An anti-skid control apparatus for a motor vehicle according to claim 12, wherein said predetermined values employed in said conditions (a) and (b) are so selected as to correspond to approximately zero output of said acceleration sensor.

14. An anti-skid control apparatus for a motor vehicle according to claim 12, wherein said predetermined values employed in said conditions (c) is so selected as to correspond to substantially a cruising speed of said motor vehicle.

15. An anti-skid control apparatus for a motor vehicle according to claim 12, wherein said mean value of the output of said acceleration sensor is determined cyclically when said conditions (a) to (c) are satisfied, further comprising:

storage means for storing said mean value and updating said mean value whenever said mean value is newly determined.

16. An anti-skid control apparatus for a motor vehicle according to claim 12, wherein said condition (b) is invalidated when said motor vehicle is driven with four driving wheels.

17. An anti-skid control apparatus for a motor vehicle according to claim 11, wherein said vehicle speed is determined by integrating a signal derived by subtracting said mean value from the output of said acceleration sensor means.

18. An anti-skid control apparatus for a motor vehicle for controlling braking forces applied to individual wheels of the motor vehicle on the basis of differences between a vehicle speed and wheel speeds in order to prevent skid of the wheels relative to the ground surface, comprising:

acceleration sensor for detecting vehicle acceleration of said motor vehicle;

wheel speed sensors for detecting speeds of individual wheels of said motor vehicle; and control means for controlling braking forces to be applied to said wheels, respectively, on the basis of the outputs of said acceleration sensor and said wheel speed sensors;

wherein said control means includes:

means for determining as an offset quantity a mean value of the output of said acceleration sensor over a predetermined period on the condition that (a) accelerations or decelerations of said wheels, (b) differences in the wheel speed among different wheels, (c) change in the wheel speed of each of said wheels and (d) change in the output of said acceleration sensor means are continuously maintained smaller than respective predetermined values during said period and that the (e) wheel speed of each of said wheels is continuously greater than a predetermined value during said predetermined period; and means for determining said vehicle speed of said motor vehicle during periods subsequent to said predetermined period on the basis of a value obtained by subtracting said offset quantity from the output of said acceleration sensor.

19. An anti-skid control apparatus for a motor vehicle according to claim 18, wherein said vehicle speed is determined by integrating a signal derived by subtracting said offset quantity from the output of said acceleration sensor.

20. An anti-skid control apparatus for a motor vehicle according to claim 19, wherein said offset quantity value of the output of said acceleration sensor is determined cyclically when said conditions (a) to (e) are satisfied, further comprising:

storage means for storing said mean value and updating said mean value whenever said mean value is newly determined.

21. An anti-skid control apparatus for a motor vehicle for controlling braking forces applied to individual wheels of the motor vehicle on the basis of differences between a vehicle speed and wheel speeds in order to prevent skid of the wheels relative to the ground surface, comprising:

acceleration sensor for detecting vehicle acceleration of said motor vehicle;

wheel speed sensors for detecting speeds of individual wheels of said motor vehicle; and control means for controlling braking forces to be applied to said wheels, respectively, on the basis of the outputs of said acceleration sensor and said wheel speed sensors;

wherein said control means includes:

averaging means for determining a mean value of the output of said acceleration sensor over a defined period during which the condition that said motor vehicle is making a substantially straight drive at a substantially constant speed on a substantially level ground surface during said predetermined period is continuously satisfied during said predetermined period;

vehicle acceleration determining means for determining a vehicle acceleration on the basis of changes in the wheel speeds during said predetermined period;

subtraction means for subtracting said vehicle acceleration outputted from said vehicle acceleration determining means from said mean value outputted from said averaging means;

store means for storing a value obtained from said subtraction as an offset quantity; and means for determining a vehicle speed of said motor vehicle during a period subsequent to said defined period on the basis of a value obtained by subtracting said offset quantity from the output of said acceleration sensor.

22. An anti-skid control apparatus for a motor vehicle according to claim 21,
wherein said vehicle speed is determined by integrating a signal derived by subtracting said offset quantity from the output signal of said acceleration sensor.

23. An anti-skid control apparatus for a motor vehicle according to claim 22,
wherein said mean value of the output of said acceleration sensor is determined in the state where at least undermentioned conditions (a) to (c) are continuously satisfied during said defined period:
(a) accelerations of said wheels are not greater than a predetermined value;
(b) difference in the wheel speed among said individual wheels is not greater than a predetermined value; and
(c) said wheel speed is continuously higher than a predetermined value.

24. An anti-skid control apparatus for a motor vehicle according to claim 23,
wherein said predetermined values employed in said conditions (a) and (b) are so selected as to correspond to approximately zero output of said acceleration sensor.

25. An anti-skid control apparatus for a motor vehicle according to claim 23,
wherein said predetermined values employed in said conditions (c) is so selected as to correspond to substantially a cruising speed of said motor vehicle.

26. An anti-skid control apparatus for a motor vehicle according to claim 23,
wherein said mean value of the output of said acceleration sensor is determined cyclically when said conditions (a) to (c) are satisfied, and said store means stores said mean value and updating said mean value whenever said mean value is newly determined.

27. An anti-skid control apparatus for a motor vehicle according to claim 22,
wherein said condition (b) is invalidated when said motor vehicle is driven with four driving wheels.

28. An anti-skid control apparatus for controlling braking forces applied to individual wheels of the motor vehicle on the basis of differences between a vehicle speed and wheel speeds in order to prevent skid of the wheels relative to the ground surface, comprising:
acceleration sensor for detecting vehicle acceleration of said motor vehicle;
wheel speed sensors for detecting speeds of individual wheels of said motor vehicle; and
control means for controlling braking forces to be applied to said wheels, respectively, on the basis of the outputs of said acceleration sensor and said wheel speed sensors;
wherein said control means includes:
averaging means for determining a mean value of the output of said acceleration sensor over a time period on the conditions that accelerations or decelerations of the wheels and differences in the wheel speed among different wheels are both smaller than respective predetermined values and that said motor vehicle is driven with two driving wheels;
subtraction means for subtracting said vehicle acceleration determined on the basis of changes in the wheel speeds during said time period from the aforementioned mean value;
store means for storing a value obtained from said subtraction as an offset quantity for said acceleration sensor; and
means for determining a vehicle speed of said motor vehicle during a period subsequent to said time period on the basis of a value obtained by subtracting said offset quantity from the output of said acceleration sensor.

29. An anti-skid control apparatus for a motor vehicle according to claim 28,
wherein said vehicle speed is determined by integrating a signal derived by subtracting said offset quantity from the output of said acceleration sensor.

30. An anti-skid control apparatus for a motor vehicle according to claim 28,
wherein said offset quantity value of the output of said acceleration sensor is determined cyclically when said conditions are satisfied, further comprising:
storage means for storing said mean value and updating said mean value whenever said mean value is newly determined.

31. An anti-skid control method for a motor vehicle for controlling breaking forces applied to individual wheels of the motor vehicle on the basis of difference between a vehicle speed and wheel speeds in order to prevent skid of the wheels relative to the ground surface, comprising the steps of:
(I) detecting acceleration of said motor vehicle;
(II) detecting wheels speed of individual wheels of said motor vehicle; and
(III) controlling braking forces to be applied to said wheels, respectively, on the basis of differences between a vehicle speed of said motor vehicle and said wheels speeds;
said control step (III) including the steps of:
(i) determining a mean value of said detected acceleration over a time period in the state where undermentioned conditions (a) to (c) are continuously satisfied during said time period:
(a) acceleration of said wheels are not greater than a predetermined value;
(b) differences in the wheel speed among said individual wheels is not greater than a predetermined value; and
(c) said wheel speed is continuously higher than a predetermined value, and
(ii) determining said vehicle speed by integrating a signal derived by subtracting an offset quantity from the acceleration actually detected, said offset quantity being a measured acceleration of said motor vehicle detected during a time when the actual acceleration of said motor vehicle is zero.

32. An anti-skid control method for a motor vehicle for controlling braking forces applied to individual wheels of the motor vehicle on the basis of differences between a vehicle speed and wheel speeds in order to prevent skid of the wheels relative to the ground surface, comprising the steps of:
(I) detecting vehicle acceleration of said motor vehicle;
(II) detecting speeds of individual wheels of said motor vehicle; and (III) controlling braking forces to be applied to said wheels, respectively, on the basis of said acceleration and said wheel speeds;

said control step (III) including the steps of:

(i) determining a mean value of the output of said detected acceleration over a predetermined period in the state where undermentioned conditions (a) to (c) are continuously satisfied during said period;
  (a) accelerations of said wheels are not greater than a predetermined value;
  (b) difference in the wheel speed among said individual wheels is not greater than a predetermined value; and
  (c) said wheel speed is continuously higher than a predetermined value;

(ii) determining a vehicle acceleration on the basis of changes in the wheel speeds during said predetermined period;

(iii) subtracting said vehicle acceleration outputted from said step (ii) from said mean value outputted from said step (i); and (iv) storing a value obtained from said subtraction as an offset quantity; and (v) determining said vehicle speed by integrating a signal derived by subtracting said offset quantity from the acceleration actually detected.

\* \* \* \* \*